Feb. 18, 1964 T. J. O'DONNELL 3,121,309
SPHERICALLY-SHAPED ROCKET MOTOR
Filed Aug. 7, 1961

INVENTOR
Thomas J. O'Donnell

BY Martha L. Ross
AGENT

United States Patent Office 3,121,309
Patented Feb. 18, 1964

3,121,309
SPHERICALLY-SHAPED ROCKET MOTOR
Thomas J. O'Donnell, McLean, Va., assignor, by mesne assignments, to the United States of America as represented by the Administrator of the National Aeronautics and Space Administration
Filed Aug. 7, 1961, Ser. No. 129,579
7 Claims. (Cl. 60—35.6)

This invention relates to solid propellant rocket motors and more particularly to spherically-shaped rocket motors possessing a predetermined burning surface within and without the propellant grain.

The solid propellant in known spherical rocket motors contains a central passage or perforation having a star-shaped, or similar, cross-section projecting inwardly from the aft hemisphere. Upon ignition, the propellant burns on the uninhibited exposed surfaces within this passage. This internal burning progresses outwardly toward the motor casing and is sometimes referred to as burnback. Ideally, the flame front reaches the casing simultaneously throughout the sphere. However, the passage opening in the aft hemisphere causes the flame front to reach the aft casing prior to reaching the forward casing. Nevertheless, if a constant pressure and thrust level is maintained throughout the burning by presenting a constant burning surface area, the only major drawback to having the flame front reach the aft casing first will be a requirement for additional insulation in this region to protect the motor casing from the hot combustion products. In the forward end the propellant grain itself will afford insulation for the casing.

In the aforementioned propellant possessing a star-shaped central passage, the shape of this passage is such that, upon burning, the flame front does not reach the casing simultaneously throughout the forward hemisphere either, and causes portions of the propellant, known as sliver or scrap, left to be burned. Instead of abrupt burnout and termination of thrust, there will be a gradual decrease in thrust as the scrap burns.

While a primary reason for a star is to achieve a constant burning surface from ignition to burnout, still the variation from the maximum burning surface to the average burning surface will be of the order of 10% or more. This variation will cause a significant change in the thrust over the burning time and is, therefore, undesirable. Further the star-shape reduces the thickness of the web, and thus the loading density and the burning time of the propellant.

Accordingly, it is an object of this invention to provide a spherical solid propellant rocket motor possessing abrupt burnout and thus elimination of scrap.

Another object is to provide a burning surface area that is more constant than that attained by known spherical grain propellants.

Still another object is to provide a propellant grain with an increased web that results in longer burning times.

A further object is to provide a propellant grain whose central passage is so formed as to avoid the possibility of mechanical failure due to stress concentrations such as found in star-shaped cores.

Other objects of the invention will become apparent by referring to the detailed description taken in conjunction with the following drawings wherein FIGURE 1 is a partial longitudinal cross-section of the rocket motor according to the invention.

In accordance with the present invention, a spherical solid propellant grain is formed with a central, cylindrical passage extending from the surface of the aft hemisphere in the zone of the exhaust nozzle forward to the center of the sphere and terminates in a forward hemispherical surface concentric with the forward exterior surface of the spherical grain. An inhibitor covers the exterior of the spherical grain except for an annular surface surrounding the passage aperture in the aft hemisphere. Ignition takes place both in the interior passage and on the exterior annular surface. The forward hemisphere burns progressively from its interior outward toward the casing with the burning surface increasing as the square of the distance burned. The aft hemisphere by virtue of the external ignition burns regressively. This regressivity when matched to the progressivity of the forward hemisphere produces a substantially constant burning surface area. Burnout is abrupt, leaving no scrap or sliver.

Figure 1:
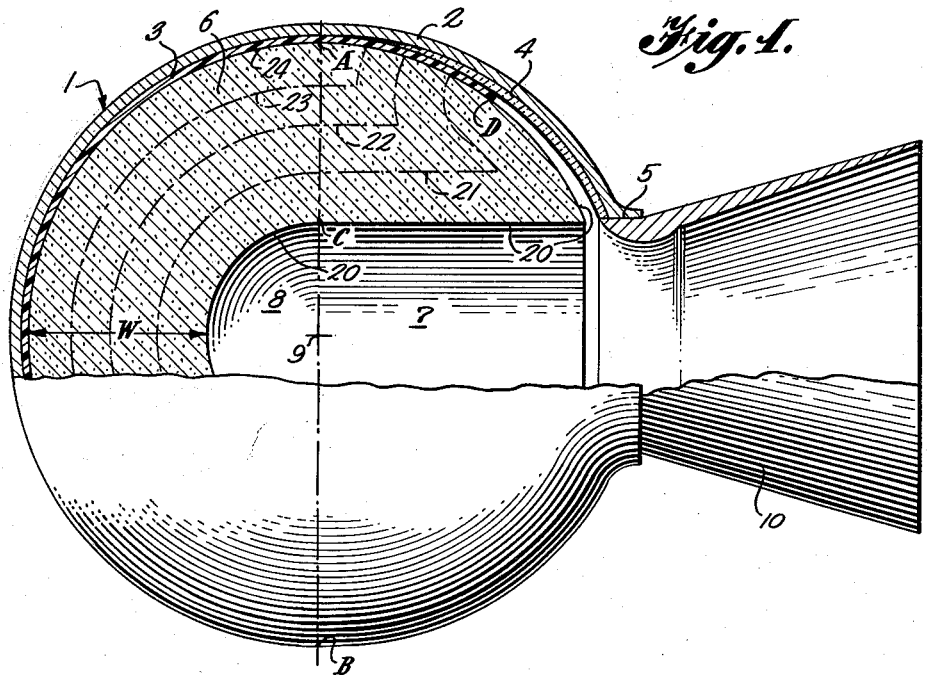

FIGURE 1 is a partial longitudinal cross-section of a spherical rocket motor generally designated as 1, having a casing 2 which can be of any suitable material, such as steel or titanium, containing solid propellant grain 6 coated with a combustion inhibitor 3, such as polyurethane, which may be bonded to the casing 2 and covers the major portion of its interior surface, as shown. The casing 2 contains insulation 4 which gradually increases from the general area of the juncture plane of the forward and aft hemisphere to the exhaust port 5 of the casing 2. In the embodiment shown, the propellant grain 6 is cast within the casing 2 and bonded to the inhibitor 3. The propellant grain can comprise any suitable propellant composition, as for example, a mixture of an organic polymer binder such as polyvinyl chloride or polyurethane resin, and an inorganic oxidizing agent such as ammonium perchlorate. An additional fuel such as aluminum powder may be added to the mixture.

Extending from the aft hemisphere inward to the center of the propellant grain 6 is a cylindrical passage 7 terminating at its forward end in a hemisphere 8 whose radius equals the radius of the cylinder and originates at point 9 which is also the center of the sphere. The aft end of the casing 2 has a circular opening, being the aforementioned exhaust port 5, to which is attached a conventional exhaust nozzle 10 in any known manner such as by welding or threading. Upon ignition by an igniter, not shown, the exposed uninhibited surfaces of the propellant burn to form combusion gases that exit through the exhaust nozzle 10 creating thrust to propel the rocket.

Initially, the burning surface is on the area designated 20. Examples of successive positions of the burning surface that will occur are at 21, 22, 23 and 24, the last being the forward hemisphere when abrupt burnout will occur.

The letter "W" in FIGURE 1 indicates the web thickness of the propellant. It is desirable to have a large web-to-diameter ratio as is present in this invention, since the burning time, $t_b$, is equal to the web, "W," divided by the burning rate, $r$. The web-to-diameter ratio is generally within the range of .25 to .4. The web-to-diameter ratio of star-shaped passages is considerably less and is generally in the order of .15 to .2, because the arms of the star project further toward the casing. Thus, in the present invention, the increased web thickness affords a greater motor loading density and burning time, assuming the propellants used have the same burning rate.

The surface coverage for the inhibitor is determined as follows: The plane through points A, 9 and B divides the sphere into two hemispheres. If the distance A to D is made equal to the web thickness, then the flame front proceeding from C to A will arrive at point A at the same time as the flame front proceeding from point D. This will give the final burning surface of the forward hemisphere. Point D, then, is the aft limit of the inhibitor 3. If a greater or smaller final burning surface is desired, then the distance AD could be accordingly made either larger or smaller than the web. However, too great a change will affect the uniform burning surface during burnback since the initial and final burning areas will not be equal.

Figure 2:
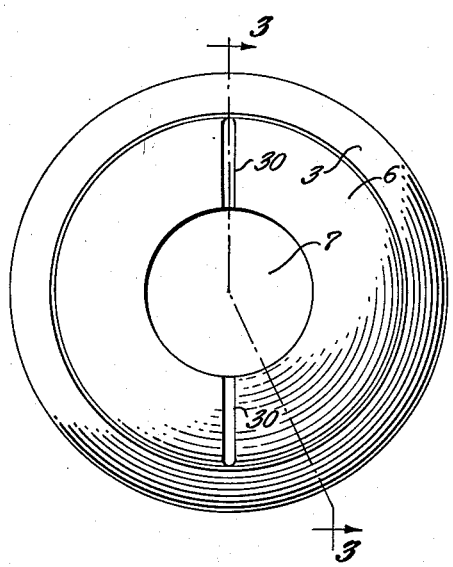
FIGURE 2 is a further embodiment of the invention.
Figure 3:
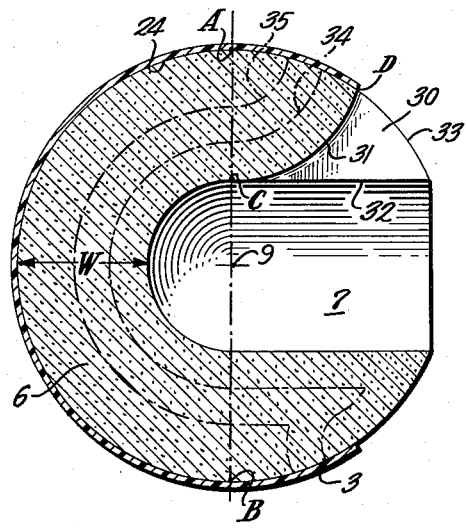
FIGURE 3 is a longitudinal cross-section of the invention of FIGURE 2.

FIGURES 2 and 3 show a modification of the perforation. FIGURE 2 is a view from the aft end forward, showing just the inhibitor 3 and the propellant 6. One or more narrow slots 30 extending from the cylindrical passage 7 are formed in the grain. In the longitudinal cross-sectional view of FIGURE 3, the configuration of slot 30 is shown as a substantially triangular recess formed by side 31 which follows an arc equal in radius to the web and extends from point C to point D which is the upper limit of the inhibitor 3; side 32, which is coincident with the cylindrical passage 7; and side 33, which is coincident with the outer surface of the sphere. The purpose of the slots 30 is to afford additional initial propellant burning surface since it has been found that the final burning surface, as shown in FIGURE 1, generally included the entire surface of a hemisphere 24 and was larger than the initial burning surface 20. The variation between the maximum burning surface and the average burning surface is reduced to about 7%, resulting in less variance of thrust during the burning time. While it is possible to add a large number of slots, in practice the optimum number is about three. Instead of providing slots 30, the diameter of the cylindrical passage 7 can be increased to obtain a larger initial surface, but this reduces the volume of propellant and the web thickness, thus making for somewhat less efficient utilization of the available space. By providing slots the web remains the same size, and the burning time is not reduced. In FIGURE 3, the burnback surfaces 34, 25 and 24 caused by slot 30 still end at point A, at which time abrupt burnout occurs. For clarity, the burnback of the propellant adjacent to sides 32 and 33 of the slot is not shown.

A spherical grain with a cylindrical perforation, with or without aft slots, is free from the stress concentrations normally found in grains having star-shaped perforations. These stress concentrations form around the sharp or pointed areas of the star and often result in mechanical failure of the grain. Such a failure, which is usually a crack or fissure, exposes additional surface upon which ignition will take place, adversely affecting the performance of the rocket.

While the particular embodiments of the spherical motor shown herein have the propellant grain cast within the spherical casing, other types of motor construction are possible. When a precast grain is used, the casing is formed in two hemispheres. The precast grain is inserted in one hemisphere and is covered by the other. The two hemispheres can be connected by threading, welding or other known means.

An inspection of FIGURE 1 will show that the aft hemisphere of the casing 2 is not a true hemisphere since the insulation 4 is present. In practice, it has been found to be easier to manufacture spherical casing and thus it is the aft hemisphere of the propellant that is not a true hemisphere. Nevertheless, the propellant is still called a spherical grain in the art. The claims are intended to cover this practical embodiment as well as the many embodiments that can be made of the present invention without departing from its spirit.

I claim:
1. A rocket motor comprising a substantially spherical casing having an exhaust nozzle, a substantially spherical solid propellant grain within said casing, a passage in communication with said exhaust nozzle extending radially inwardly from the rearmost exterior surface of said grain to the center of said grain and having cylindrical side walls, said passage terminating forward of said center as a hemispherical surface concentric with the forward hemisphere of said grain, and a combustion inhibitor coating the exterior forward hemispherical surface of said grain and extending rearwardly over the exterior rear hemispherical surface equally in an arc whose chord is equal in length to the web thickness of the grain in the forward hemisphere.

2. A rocket motor as claimed in claim 1 wherein the spherical grain has at least one slot extending outwardly from the cylindrical side walls to the exterior rear hemispherical surface.

3. A rocket motor as claimed in claim 1 wherein the spherical grain has a plurality of slots extending outwardly from the cylindrical side walls to the exterior rear hemispherical surface.

4. A rocket motor comprising a substantially spherical casing having an exhaust nozzle, a substantially spherical solid propellant grain within said casing, a passage in communication with said exhaust nozzle extending inwardly in a radial direction from the exterior of the aft hemispherical surface to the center of said grain and having cylindrical side walls, said passage terminating forward of said center as a hemispherical surface concentric with the forward hemisphere of said spherical grain and having a radius equal to the radius of the passage in the aft hemisphere, an aperture formed by the intersection of said passage with said aft hemispherical surface, and a combustion inhibitor coating on the exterior surface of the grain, said coating being terminated on the aft hemisphere in a transverse plane spaced forwardly from said aperture to form an exposed annular surface free of said inhibitor, said annular surface and the interior surface of said passage forming the initial burning surface of said grain.

5. A rocket motor as claimed in claim 4 wherein said spherical grain has at least one slot extending outwardly from the cylindrical side walls to the exposed annular surface to provide additional initial burning surface.

6. A rocket motor comprising a substantially spherical casing having an exhaust nozzle, a substantially spherical solid propellant grain within said casing, a cylindrical passage in communication with said exhaust nozzle extending radially inwardly from the exterior surface of said grain and terminating inwardly as a hemispherical surface, an aperture formed by the intersection of said passage with said exterior surface, and a combustion inhibitor coating on the exterior grain surface, said coating terminating in a plane transverse to the longitudinal axis of said passage and spaced from said aperture to form an uninhibited surface surrounding said aperture.

7. A rocket motor as claimed in claim 6 wherein the spherical grain has at least one slot extending outwardly from said cylindrical passage to said uninhibited surface.

References Cited in the file of this patent
UNITED STATES PATENTS

| | | |
|---|---|---|
| 3,001,363 | Thibodaux et al. | Sept. 6, 1961 |
| 3,032,970 | Fox | May 8, 1962 |